United States Patent Office 3,317,271
Patented May 2, 1967

3,317,271
COMPOSITIONS CONTAINING A NEUTRAL-DYEING PREMETALIZED DYE AND PROCESS OF DYEING POLYAMIDES THEREWITH
Jerry Michael Mecco, Somerville, N.J., assignor to American Cyanamid Company, Stamford, Conn., a corporation of Maine
No Drawing. Filed Dec. 26, 1963, Ser. No. 333,674
10 Claims. (Cl. 8—42)

The present invention relates to a novel process for level-dyeing nitrogenous materials with presently-available metalized dyes which previously could not be so utilized. More particularly, it is concerned with a process for level-dyeing synthetic nitrogenous polyamides.

Still more specifically, the invention also presents novel liquid-dye compositions which enable the synthetic nitrogenous polyamides to be colored with the desired dyes at the desired pH range. Resultant dyeings are characterized by excellent, strong, level shades having good fastness properties. They exhibit no physical damage to the material.

As used in this discussion, the term "level dyeing" means dyeing nitrogenous materials so as to produce strong, level shades free of skittery and heathery effects. The term "metalized dye" relates to a heavy-metal azo-dye complex having one atom of a metal of an atomic number greater than 23 but less than 29 chelated with two molecules of a monoazo dye free of ionogenic groups, i.e., sulfonic or carboxylic acid groups, or salts thereof. Such dyes are frequently termed "neutral-dyeing premetalized dyes" and may be applied from neutral, or only slightly acid dye baths.

As contemplated by the present invention, the term "nitrogenous fibers" includes both natural and synthetic materials, most of the latter being organic, hydrophobic materials. These nitrogenous fibers may be classified generally into two broad groups as (A) proteins and (B) synthetics. As used in this discussion, group (A) includes both natural and synthetic proteins, and group (B) includes various types of synthetic, organic, nitrogen-containing polymeric fibers.

The older group, group (A), often is more precisely defined as a basic, nitrogen-containing group, i.e., as materials wherein the nitrogen is present in a basic form. This class includes such natural protein fibers as wool, mohair, fur, alpaca, real silk, Tussah silk, and the like. It also includes synthetic protein fibers such as those derived from corn, peanuts, milk and the like.

In recent years, industry has developed a large number of varied synthetic fibers, each having desirable properties. Some of these comprise the above-noted group (B) of this invention. Among these are included the various acrylic polymers containing basic-nitrogen groups and the various super-polyamides, known generally in the trade as "nylons." These nylons are the materials of primary interest in the present invention; particularly the continuous filament nylons. The latter comprise the fibers most commonly encountered in the synthetic problem fibers to be dyed.

Accordingly, for purposes of this discussion, continuous filament nylons produced especially for carpets will be used as illustrative. During their manufacture, these filaments are delustered and given a unique fiber cross section to reduce visual soiling. They also are randomly crimped to provide proper bulk. These several properties produce a product which has a commercially attractive balance of initial aesthetics, physical performance and production economics.

Unfortunately, despite the several advantages of the physical and optical properties of these continuous filament nylons and/or yarns formed therefrom, in the past no wholly satisfactory process has been available by which they could be level-dyed to produce the level, fast shades useful in the carpet industry.

In the past, attempts have been made to color these nylons, usually in the form of yarns or woven carpets, with a variety of dyes including acid dyes, milling dyes, acid-dyeing premetalized dyes, disperse (acetate) dyes and neutral-dyeing premetalized dyes, and the like. All have one or more disadvantages in actual use. For example, although acid dyes, including milling dyes, have better than average brightness, they tend to accentuate the imperfections in the nylon. Carpets so-dyed are generally considered commercially unsatisfactory. Acid-dyeing premetalized dyes also have the desired brightness but they must be applied at low pH conditions. On the weight of the fiber (OWF) they ordinarily require about 8% sulphuric acid which produces a pH of about 1.5 to 2.0 in the dye bath. Adding a nonionic agent, as for example in U.S. Patents 2,470,080, 2,638,404 and 2,723,178, permits reduction of the sulphuric acid to about 4–5%. The resultant pH is raised somewhat, but is still below about four. Most manufacturers are reluctant to expose expensive nylon yarns and carpets to such highly-acid conditions at the required high temperatures. Especially is this true when a cellulosic-type backing is used.

Disperse dyes, when applied by processes conventional therefor, may produce shades having satisfactory levelness. However, such dyeings are lacking in such important properties as fastness-to-light; resistance to rug shampoo; resistance to gas fading; and resistance to "Florida fade." Such dyes also tend to sublime during application of rubber backing to the dyed carpet when the temperature may rise to some 370°–380° F. This sublimation may cause the shade to change or the shade may become weaker due to a loss of the dye.

Consequently, coloring of such nylon yarns has been largely restricted to the use of commerically-available, neutral-dyeing, premetalized dyes. In a typical current process for applying such colorants, a dye bath is prepared by adding the required amount of water to the dye vessel; adding thereto (1) about 0.1 to 4.0 weight percent (OWF) of the neutral-dyeing, premetalized dye, usually prewet in a small volume of water; and (2) finally adding an ammonium salt such as the acetate, usually in amount of about three weight percent (OWF). Ordinarily, the dye bath will be about ambient temperature and have a pH of about six. After the nylon is entered into the dye bath, heat is applied and the nylon is turned during the process to improve the levelness of the dyeing. Heating is continued to bring the dye bath slowly to the boil where it is maintained for a short time. Usually, a second addition of ammonium acetate (3% OWF) is then made and dyeing at the boil continued until dyeing is completed. The dyed material is then separated from the dye bath, rinsed and dried.

This procedure, too, has several disadvantages. These dyes have strong affinity for the fiber and exhaust extremely rapidly from the bath. As a result, they build up irregularly on the fiber. This uneven attachment of the dye to the fiber results in a "skittery" or "heathery" effect which renders the dyed material useless for merchandising. This unlevel effect, resulting in the "skittery" or "heather" shades, is troublesome with all the nitrogenous fibers noted above, but is especially bad on yarns and woven materials of the illustrative nylons. Consequently, even the use of these neutral-dyeing premetalized dyes is not generally satisfactory for coloring nylon carpeting.

Several methods have been suggested to overcome this tendency of the dye to produce unlevelness. Cationic or anionic surfactants have been added to the dye bath for the purpose of competing with the dye for the dye-sites on the fiber, or for complexing with the dye, retarding dyeing, and thereby producing level shades. The use of these surfactants do, in many instances, retard dyeing but not sufficiently to produce a level shade. Further, so-dyed shades have a tendency to crock, or rub off, and in some instances the fastness-to-light may be affected.

It has also been suggested to add certain nonionic surfactants to the dye bath. These nonionic surfactants are useful in reducing the amount of strong acid required to give full shades with the acid-dyeing type of dye. However, when used in a neutral bath, the shade may appear to be level, but the dye bath is not exhausted and a considerable loss in color value occurs. Consequently, this unabsorbed dye is wasted, adding to the expense of operation.

Despite the advantageous properties of the illustrative nylon yarns and carpets, such as their resistance to crushing, fuzzing, pilling, and soil; their high-bulk and lightness in weight; and their greatly improved optical properties; prior to this invention there still remained a need for a more suitable dyeing process therefor. Such a process should combine the following desirable features:

(a) Uniform build-up of the dye on the fiber;
(b) Level, strong shades;
(c) Good penetration of the fiber by the dye;
(d) Maximum fastness properties of the dyed material;
(e) Good resistance to gas fade, Florida fade, and rug shampoo; and
(f) Good exhaust of the dye from the bath onto the fiber.

Such a process should be easily and simply applied; it should enable satisfactory, level-dyeing to the desired deep shades using commercially-available, neutral dyeing premetalized dyes and it should avoid physical damage to the fibers. Most important, it should eliminate the tendency toward unlevelness resulting in the skittery or heathery effect produced by the present conventional processes.

Surprisingly, in view of the established need for such a process and the previous lack of success in providing one, a procedure has been found according to the present invention, which combines the desired features to a remarkably high degree. In general, this new process may be readily described. The nylon, in the desired physical form such as yarns, carpets, non-woven webbing and the like, is:

(1) Wet-out with water;
(2) Entered into a dye bath at ambient temperature, the bath having the following general composition:
  (a) The neutral-dyeing premetalized dye in the form of a liquid dye composition comprising—
    (1) the neutral dyeing premetalized dye
    (2) a polyalkylene glycol monoalkyl ether
    (3) a nonionic surfactant
    (4) water, and optionally
    (5) an alkanol amine
  (b) A liquid dyeing assistant consisting of a polyalkylene glycol monoalkyl ether and a nonionic surfactant;
  (c) An alkali-metal salt, and optionally
  (d) An antifoaming agent;
  (e) The pH of the bath ranging from about 6.0 to 8.0. (For nitrogenous fibers other than the continuous, filament nylon, an ammonium salt, ammonia or acetic acid in amount sufficient to produce a pH not lower than about 4.5, preferably 5.5–6.5 is added.)
(3) Heating the aqueous bath containing the nylon material slowly with stirring, or turning, to about 195° F. to 215° F. to transfer the neutral-dyeing premetalized dye onto the nylon material;
(4) Maintaining at this temperature until dyeing is complete; and
(5) Separating the colored material from the aqueous bath; and thereafter conventionally rinsing and drying the dyed material.

A particular feature of the invention, as discussed more fully below, is the inclusion of items (a) and (b) in the dye bath. For purposes of identification, item (a) will be referred to below as "the liquid dye composition" and item (b) as the "liquid dyeing assistant."

An advantage of my invention is that the "liquid dye composition" is completely stable over long periods of time. It may be added to the dye bath at any stage of the dyeing procedure and, therefore, may be utilized for correcting, or strengthening, shades as the dyeing proceeds. Liquid compositions of this type are contemplated within the scope of my invention.

It is also within the scope of the invention that portions of the polyalkylene glycol monoalkyl ether and the nonionic surfactant may be withheld from the liquid dye compositions and combined to form a "liquid dyeing assistant" which, subsequently, may be added to the dye bath. Such a dyeing-assistant composition has three advantages:

(1) The concentration of the neutral-dyeing premetalized dye may be increased in the liquid-dye composition thereby reducing packaging and transportation costs to the consumer;

(2) The amount of the dye present in the different liquid-dye compositions may be standardized at some desirable concentration as will be discussed more fully below; and (3) All dyes do not have the same solubility when the liquid-dye composition is diluted with large quantities of water as when the composition is added to the aqueous dye bath. Further additions of the liquid-dyeing assistant to the dye bath aids in maintaining the solubility of the dye.

LIQUID DYE COMPOSITIONS

As noted above, the novel liquid-dye compositions of this invention consist of at least four, and optionally five, components each of which contributes to the overall result. Therefore, these will be discussed more fully.

Useful dyestuff components

One of the primary purposes of this invention is to provide a process by which nitrogenous fibers and especially continuous filament nylons can be satisfactorily level-dyed at a neutral pH, making use of certain otherwise desirable types of dyes which previously could not be satisfactorily so-employed. To this end, it is contemplated that this invention may utilize a wide selection among presently-available dyes. In general, they fall into the group which commercially is commonly characterized as "premetalized" dyes of the neutral-dyeing type.

Such neutral-dyeing premetalized dyes differ, as a class, from the older "acid-dyeing" type. The latter may require a pH from about 1.5 to 4.0 or 4.5, as discussed above, and contain sulfonic acid groups or alkali-metal salts thereof; or other similarly ionogenic groups. In the "neutral-dyeing" type, the type with which this invention is concerned, these ionogenic groups have been converted to some modified grouping such, for example, as the sulfonamides or sulfones.

This change in the molecular structure also modifies the dyeing characteristics. Unlike the acid-dyeing type, they will not dye levelly at the usual acid content of dye baths for the older type. For optimum results, the neutral-dyeing type should be dyed from a bath having a pH of about six to eight. Even at this pH, as noted above, satisfactory dyeings are not obtained on the illustrative continuous filament nylons as noted above.

In general, neutral-dyeing premetalized dyes, as contemplated herein, may be considered to be heavy-metal complexes of monoazo compounds formed from one atom of a metal having an atomic number greater than 23 but less than 29 complexed with two molecules of the monoazo compound. No ionogenic groups are present. For illustrative purposes, the name and composition of a number of illustrative commercially important, neutral-dyeing, premetalized dyes may be listed as follows:

Red 1: The cobalt complex of one atom of cobalt chelated with two molecules of the dye obtained by coupling diazotized ortho-aminophenol-4-sulfonamide with beta-naphthol.

Red 2: The chromium complex of one atom of chromium and two molecules of the dye obtained by coupling diazotized ortho-aminophenol-5-sulfonamide with diphenylpyrazolone.

Yellow 1: The cobalt complex of one atom of cobalt and two molecules of the dye obtained by coupling diazotized ortho-aminophenol-4-sulfonamide with acetoacetanilide.

Yellow 2: The cobalt complex of one atom of cobalt and two molecules of the dye obtained by coupling diazotized ortho-aminophenol-4-sulfonamide with phenylmethylpyrazolone.

Orange 1: The cobalt complex of one atom of cobalt and two molecules of the dye obtained by coupling diazotized ortho-aminophenol-4-sulfonamide with benzoyl-acetonitrile.

Orange 2: The chromium complex of one atom of chromium and two molecules of the dye obtained by coupling diazotized ortho-aminophenol-4-sulfonamide with (4-chlorophenyl) methylpyrazolone.

Violet 1: The cobalt complex of one atom of cobalt and two molecules of the dye obtained by coupling diazotized ortho-aminophenol-5-sulfonamide with beta-naphthol.

Brown 1: The chromium complex of one atom of chromium and two molecules of the dye obtained by coupling ortho-aminophenol-4-sulfonamide with benzoyl-acetonitrile (see U.S. Patent 2,366,633).

Scarlet 1: The chromium complex of one atom of chromium and two moles of the dye obtained by coupling diazotized ortho-aminophenol-4-sulfonamide with diphenylpyrazolone.

Blue 1: The chromium complex of one atom of chromium and two mols of the dye obtained by coupling diazotized 1-amino-2-phenol-4-sulfonamide with 5,8-dichloro-1-naphthol (or the half chromium complex of 2-(2-hydroxy-4-sulfamoyl-phenylazo)-5,8-dichloro-1-naphthol).

Other illustrative dyes also are disclosed in the examples below.

The amount of dye, or dyes, added to the liquid dye composition may range from about 10 to about 22 weight percent of the total "liquid dye composition" (OWS); 18 to 20 weight percent (OWS) being a good concentration. As noted above, solubilities of dyes differ. It is desirable to maintain a standard concentration at which substantially no precipitation occurs.

The amount of dye may be lowered in the liquid compositions to less than about 18 weight percent (OWS). However, one factor is critical. Should the dye concentration be so lowered, it is necessary to increase the amount of the polyalkylene glycol monoalkyl ether component, not the water content. Lower concentrations unnecessarily increase the "unit dye" cost because of additional packaging and shipping charges.

The polyalkylene glycol ether

The second component of the novel composition of this invention is a polyalkylene glycol monoalkyl ether. The methyl, ethyl and butyl ethers of diethylene glycol produce excellent results. Because of its commercial availability, the monoethyl ether of diethylene glycol (Carbitol) is to be preferred.

Amounts in the liquid dyeing composition ranging from about 30 to about 50 weight percent of the total composition may be used, but about 35 to 40 weight percent (OWS) is a good practice. Twenty parts of the neutral-dyeing premetalized dyes are readily soluble in 100 parts thereof. Use of this amount of Carbitol prevents settling-out of the dye over long periods of time. A further advantage is that this amount provides non-freezing and non-drying properties.

Just how polyalkylene glycol monoalkyl ethers assist in solubilizing the premetalized neutral-dyeing dyes and preventing their settling-out over long periods of time is not known. The result is unexpected. Monoalkylene glycol monoalkyl ethers (such as Cellosolve) appear to dissolve the dye. However, the resultant composition is unstable and the dye quickly settles out. Such a composition is commercially unacceptable.

The nonionic surfactant

The third component of the novel composition is a nonionic surfactant. All the nonionic surfactants which are employed are of known types, and a number are readily available under a variety of commercial designations. Many examples of nonionic surfactants are shown in "Detergents and Emulsifiers-up-to-date," published annually by John W. McCutcheon, Inc., of New York city. Useful products are the condensates of ethylene oxide with long chain fatty acids, fatty alcohols and fatty amides.

One suitable type is frequently referred to as the "phenolic" type. These are commercially-available products obtained by condensing about one mol of an alkyl phenol with from about six to ten mols ethylene oxide. The alkyl moiety of the phenol should be a medium length chain of about six to ten carbon atoms. A typical illustrative product is that obtained by condensing one mol of nonyl phenol with nine mols of ethylene oxide.

Other illustrative products include alkaryl polyether alcohols such as "Deceresol NI" sold by the American Cyanamid Company; "Surfonic" N-60 and N-95 sold by the Jefferson Chemical Company, Inc.; polyoxyethylene ether alcohols such as "Renex" 30 sold by the Atlas Powder Company or "Triton" X-100 sold by Rohm and Haas, Philadelphia.

In general, amounts in the liquid dyeing composition ranging from about 15 to 25 weight percent (OWS) enable satisfactory results to be obtained and about 18 to about 23 weight percent (OWS) is a good practice. An insufficient amount of the nonionic surfactant may increase the tendency for the neutral-dyeing premetalized dye to aggregate on the nylon and cause the dyed material to crock; an excessive amount may retard the dyeing and prevent complete exhaustion of the dye from the bath onto the fiber.

As noted above, it is within the scope of my invention to combine the polyalkylene glycol monoalkyl ether and the nonionic surfactant components to form the aqueous-soluble dyeing assistant. In the development of the invention, a good practice was found to be the use of equal parts by weight of the two constituents in the dye bath. As will be noted below in the discussion on dyeing, the addition of about two weight percent on the weight of the fiber (OWF) to the dye bath assists in maintaining solubility when the dye is added to the dye bath.

Water

The fourth component of my novel liquid-dye composition is water. Surprisingly, when water is completely eliminated from the liquid-dye composition, satisfactory results with some dyes are not obtained. The amount of added water should be held at about 15 to about 20 weight percent (OWS). This gives a composition which resists freezing, specking and drying out. Amounts greater than about twenty weight percent (OWS) may reduce the stability of the liquid-dye composition; increase the possibility of freezing when the composition is exposed to cold weather; and permit the composition to dry out when an open container is exposed to high temperatures for a period of time as when the container is left outside in a summer sun.

The optional alkanolamine

For some neutral-dyeing premetalized dyes, addition of a small quantity of an alkaline organic chemical to the liquid-dye composition also will be found useful. Illustratively, alkanolamines aid in maintaining solubility of many neutral-dyeing premetalized dyes, particularly triethanolamine. This compound also aids in maintaining a neutral to slightly alkaline pH in the dye bath. Amounts ranging from about one to about four weight percent (OWS) may be employed although about two to three weight percent is a good practice. When the alkanolamine is added, the amount of water is reduced accordingly.

In solubilizing the heavy-metal complex of the azo dyes, it is preferred that the polyalkylene glycol monoalkyl ether be added first to the dye. Thereafter, the order of addition of the surfactant, water, and alkanolamine when used, is optional.

A further advantage of my process is that the heavy-metal azo-dye complex, the polyalkylene glycol monoalkyl ether, the nonionic surfactant, water, and alkanolamine may be precombined in the required proportions, thereby simplifying the work of the dyer. Compositions of this type also constitute an embodiment of my invention. A typical illustrative composition of this type contains, by weight,

| | Parts |
|---|---|
| Heavy-metal azo-dye complex | 20 |
| Polyalkylene glycol monoalkyl ether | 40 |
| Nonionic surfactant | 20 |
| Water | 20 |

The heavy-metal, azo-dye complex readily dissolves to form a liquid dye composition which is stable over long periods of time and shows no tendency to precipitate, is economical to package and transport, and is convenient for the dyer to use.

When five parts (grams) of this composition is dissolved in four thousand parts of water, the resulting dye bath will contain:

| | Parts |
|---|---|
| Dye (1% OWF) | 1 |
| Polyalkylene glycol monoalkyl ether (2% OWF) | 2 |
| Nonionic surfactant (1% OWF) | 1 |
| Water | 4,000 |

When used to dye 100 parts of fiber this gives a dye bath: fiber ratio of 40 to 1, and a 1% dyeing, which is a convenient ratio for laboratory dyeings. For commercial dyeings, the water may be reduced to a ratio as low as 10 to 12:1, depending upon the type of equipment available.

Use of a dye bath composition, such as that detailed above, causes excellent results to be obtained. However, some dyes require additional polyalkylene glycol monoalkyl ether and nonionic surfactant. This is provided by the addition of two weight percent (OWF) of the 50/50 liquid dyeing assistant, or one part of each of the ingredients per 100 parts fiber, thereby increasing the polyalkylene glycol monoalkyl ether to three weight percent (OWF) and the nonionic surfactant to two weight percent (OWF), in the dye bath. However, this is not necessarily a limiting amount.

As noted above, some neutral-dyeing premetalized dyes are solubilized more readily in the presence of an organic alkaline compound such as an alkanolamine. A typical illustrative composition of this type contains, by weight,

| | Parts |
|---|---|
| Heavy-metal azo-dye complex | 20 |
| Polyalkylene glycol monoalkyl ether | 40 |
| Nonionic surfactant | 20 |
| Alkanolamine | 3 |
| Water | 17 |

To assist in the transfer of the dye from the dye bath onto the nitrogenous fiber, salts of alkali metals are frequently used, an example being sodium chloride sometimes called "common salt." Amounts required are well known in the art. However, in the examples below, it will be noted that about 30 weight percent (OWF) is included in the dye bath.

The presence of nonionic surfactants in the dye bath does increase the tendency for the bath to foam. Some foaming is not too objectionable. However, if the type of dyeing equipment used or its speed causes strong agitation, excess foaming may result. The addition of a small quantity of an antifoaming agent, such as octyl alcohol, aids in controlling the foaming tendencies. Usually about 0.1% is a good practice.

Neutral-dyeing premetalized dyes are best applied from starting baths having a pH not lower than 4.5 and preferably from about 5.0 to 8.0, depending upon the type of nitrogenous fiber that is to be colored. A dye bath having a pH of about 6.5 to 8.0 gives excellent results on the continuous filament nylon with which this invention is primarily concerned. Such a pH may be attained by the alkanolamine in the liquid dye composition or by the addition of ammonium hydroxide to the dye bath.

Some of the natural and synthetic nitrogenous fibers require dye baths having a lower final pH, preferably about 4.5 to 6.0. To obtain this result, use of about three weight percent (OWF) of an ammonium salt such as ammonium acetate, ammonium sulfate, ammonium chloride, and the like is a good practice. As the bath is heated, ammonia is driven off and the pH is slowly reduced. For those dyers who prefer to use acetic acid, the amount should be that required to adjust the pH to about 5.0 to 6.0.

The invention will be more fully described in conjunction with the following examples and tests. Unless otherwise noted, therein all parts and percentages are by weight, concentration percentages of the ingredients in the dye baths are percentages based on the weight of the fiber and are designated (OWF). Temperatures are in degrees Fahrenheit.

In conjunction therewith, the dyed materials are tested for fastness properties by the various Official Methods listed in part 11 of the 1962 Technical Manual of the American Association of Textile Chemists and Colorists. The particular tests, and the page on which these tests are described, follow.

| Color fastness test: | Page No., part 11 of manual |
|---|---|
| Wool wash test No. 3 | B-80 |
| Acid perspiration | B-72 |
| Alkalaine perspiration | B-72 |
| Dry cleaning No. 85 | B-58 |
| Dry crocking | B-57 |
| Wet crocking | B-57 |
| Light fastness | B-61 |
| Gas fading | B-69 |
| Rug shampoo* | B-75 |

*In this test, the general procedure of cotton wash test No. 2 (page B-75) is followed except that (1) a nonionic surfactant is substituted for the soap; and (2) a multi-fiber test cloth is used instead of a cotton test cloth.

EXAMPLE 1

In this example the test dye (dye A) is the dye obtained by complexing one atom of cobalt with two molecules of the dye resulting from coupling diazotized 2-aminophenol-4-sulfonamide with acetoacetanilide. This premetalized, neutral-dyeing dye (dye A) is then used to color a sample of a commercially continuous, trilobal-filament nylon in the form of a woven rug a green-gold shade.

(a) *Preparation of the "Liquid Dye Composition."*—The liquid dye composition is prepared by dissolving the dye in diethyleneglycol monoethyl ether (Carbitol), adding water, and then adding the nonionic surfactant (Deceresol NI). The proportions, mixed together in the above order, are as follows.

| Component: | Parts |
|---|---|
| Dye A | 20 |
| Carbitol | 40 |
| NI | 20 |
| Water | 20 |
| | 100 |

Resultant concentrated dye composition is a dark-brown liquid which remains clear and stable, even after long standing.

(b) *Coloring the nylon.*—In a reel-type dyeing machine, to 3,210 grams of water is added

| Component | Grams | Weight Percent (OWF) |
|---|---|---|
| Sodium chloride | 32.10 | 30 |
| Liquid dyeing assistant [1] | 2.14 | 2 |
| Octyl alcohol | 0.10 | 0.1 |
| Dye composition (a) | 5.35 | 1 |

[1] The liquid dyeing assistant consists of a 50/50 mixture by weight of Carbitol and Deceresol NI.

A piece of undyed nylon 501 rug (107 grams, dry), is then entered into the dye bath at ambient temperature and the temperature is gradually raised while the rug is being turned continuously in the reel-machine. The dye builds up on the fiber gradually from about 100° F. to about 160° F., and then more rapidly as the temperature is raised to the boil. After boiling about 15 minutes, the bath is exhausted and the dyeing is completed. At all stages of the transfer of the color from the dye bath onto the nylon, the shade remains level and is free from aggregates and plates. After rinsing and drying, the shape of the dyed rug is green-gold with excellent color value.

(c) *Fastness properties.*—The colored, green-gold rug so produced is then subjected to several fastness test procedures. The particular test and the result follow.

| Test: | Result |
|---|---|
| Wool wash test No. 3 | Excellent fastness. |
| Acid perspiration | Do. |
| Alkaline perspiration | Do. |
| Dry cleaning No. 85 | Do. |
| Rug shampoo at 120° F. | Do. |
| Dry crocking | Do. |
| Wet crocking | Do. |

Fastness-to-light (Fade-Ometer hrs.).
No break at 80 hours.

EXAMPLE 2

A liquid dye composition is prepared as in Example 1(a) except the dye is a 1:2 chromium complex of the product prepared by coupling diazotized 2-amino-phenol-4-sulfonamide to 1,3-diphenylpyrazolone (dye B). (A 1:2 chromium complex indicates one atom of chromium is chelated with two molecules of the dye.) A dark-red solution results which has good stability.

A portion of the same undyed 501-nylon rug is dyed by this composition, using the dyeing procedure of Erample 1(b), except that 0.112% (OWF) real dye is used. The pH is about 7.6. The color starts to build up at about 160° F. and the strength continues to increase gradually as the temperature approaches the boil. When the dyeing is completed, the rug has acquired a strong, level, scarlet shade free from skittery or heathery effects.

So-dyed material shows excellent fastness in all the tests listed in Example 1. The fastness-to-light is excellent in that no break occurs even after 80 hours' exposure in the Fade-Ometer.

Another portion of the dye bath is used to dye wool. The bath does not exhaust satisfactorily. Sufficient ammonium sulfate is added to reduce the pH of the bath to about 4.5, causing the dye remaining in the bath to transfer onto the wool and an excellent, strong, level, scarlet shade is obtained. The dyed wool also has excellent fastness properties. Substitution for the ammonium sulfate of acetic acid and ammonium chloride in amount sufficient to lower the pH to about 4.0 to 4.5 also produced the same satisfactory dyeing.

EXAMPLE 3

A liquid dye composition is prepared as in Example 1(a), except that the dye is the 1:2 chromium complex of the product obtained by coupling diazotized 2-amino-phenol-5-sulfonamide to 5,8-dichloro-1-naphthol (dye C). A clear, blue-black solution results which appears to be stable indefinitely.

Another portion of the same undyed nylon rug is dyed (dye C) using 0.09% real dye (OWF) in the procedure of Example 1(b). Color starts to build up at about 160° F., improves in strength during a hold for 15 minutes at 160° F. and then continues to build up as the temperature of the bath is slowly raised to 212° F. Dyeing is completed after about 15 minutes at the boil, and a level, blue shade results.

A second portion of the undyed nylon rug is dyed as above except that 1% (OWF) of the liquid dye composition of this example is used. Again, a strong, level, blue shade results. Fastness tests are made as in Example 1 and the results follow.

| Test: | Fastness |
|---|---|
| Wool wash test No. 3 | Excellent |
| Acid perspiration | Do. |
| Alkaline perspiration | Do. |
| Dry cleaning No. 85 | Do. |
| Rug shampoo at 120° F. | Do. |
| Dry crocking | Do. |
| Wet crocking | Do. |

Fastness-to-light (Fade-Ometer hrs.): No break at 80 hours.

EXAMPLE 4

A mixture of the liquid-dye compositions prepared from the dyes A, B and C as described in Examples 1, 2 and 3, respectively, is used to produce a brown shade on another sample of the same undyed nylon rug. This is then matched using disperse (acetate) dyes applied by a conventional dyeing process for disperse dyes. The shades of the two thus-dyed rugs are then compared for fastness properties.

The liquid dye compositions are combined by adding to 2,210 grams water, added 30% common salt; 2% of the liquid dyeing assistant consisting of a 50/50 mixture, by weight, of Carbitol and Deceresol NI; 0.3% octyl alcohol; and

| | Percent real dye |
|---|---|
| Liquid dye composition of Example 1 containing | 0.108 |
| Liquid dye composition of Example 2 containing | 0.112 |
| Liquid dye composition of Example 3 containing | 0.090 |
| Total | 0.310 |

The above percentages being by weight (OWF).

A 110 gm. portion of the undyed nylon rug is then entered into the dye bath at ambient room temperature and turned until uniformly wet. As the turning is continued, the bath is slowly heated to about 212° F. and held at this temperature for about 15 minutes. The nylon rug sample is dyed a brown shade which remains "on tone" throughout the entire dyeing cycle. The dyed piece is then rinsed and dried. It is uniform, level, well penetrated and shows fastness properties similar to those obtained in Example 1(c) except that a slight break in light fastness occurs after 80 Fade-Ometer hours.

The above brown shade is then matched on the same undyed nylon rug sample, using a mixture of disperse dyes applied by a conventional disperse-dye dyeing procedure. Resultant shade shows a strong break from a brown to a pink color after 40 hours in the Fade-Ometer, and is not resistant to gas fading or to rug shampoo at 120° F.

EXAMPLE 5

To 19 liters of water in a Hunter reel dyeing machine are added three liquid dye compositions to give, on the weight of the fiber, the following percent of real dye:

|  | Percent |
|---|---|
| Dye A | 0.108 |
| Dye B | 0.110 |
| Dye C | 0.090 |
| Liquid dyeing assistant | 2 |
| Common salt | 30 |

The pH of the dye bath is at this point 6.65.

Dry, undyed nylon rug weighing 110 grams is then entered at ambient temperature into the dye bath which is heated to about 90°–100° F. and the liquor circulated for about 10 minutes. The dye bath is then heated to about 160° F. in about 15 minutes and held at this temperature for thirty minutes. The dye bath is then heated gradually to 212° F. in about 20 minutes and dyed at this temperature for thirty minutes. The dye bath is then cooled slowly with water, and the final pH is 6.8.

During the dyeing cycle, the shade builds up on tone. The dyed rug is then removed from the exhausted dye bath, rinsed well, and dried. The so-dyed rug has a very level, brown shade which is commercially satisfactory.

EXAMPLE 6

To 40 grams Carbitol, 20 grams of the premetalized dye which is a 1:2 cobalt complex of the product obtained by coupling diazotized 2-aminophenol-4-sulfonamide to 1-phenyl-3-methyl-5-pyrazolone. When the dye is dissolved, 20 grams water is added, followed by 20 grams of surfactant (Deceresol NI). On further mixing, a transparent, liquid-dye composition is formed which remains clear and stable.

The resultant composition is used to give a 1.5% shade (real dye OWF) on undyed nylon rug using the dyeing procedure of Example 1(b). A level, red-yellow shade is produced.

The dyed sample has excellent fastness to wool wash test No. 3; acid and alkaline perspiration; wet and dry crocking; dry cleaning test No. 85; rug shampoo at 120° F. and three cycles of gas fading. Light fastness is excellent as the dyed material shows no break after 80 hours in the Fade-Ometer.

EXAMPLE 7

In the following example, a portion of the water is replaced with triethanolamine in preparing the liquid dye composition. To three grams of triethanolamine and 17 grams water is added 20 grams of the neutral-dyeing, premetalized dye which is the 1:2 cobalt complex of the product prepared by coupling diazotized 2-aminophenol-4-sulfonamide to 2-naphthol. Forty grams of Carbitol and 20 grams of nonionic surfactant (Deceresol NI) are then added. The mixture is then warmed until the dye is dissolved. A stable liquid dye composition results. When dyed on a nylon rug sample by the procedure of Example 2, a level, red shade is obtained; free of heathery and skittery effects.

EXAMPLE 8

The procedure of Example 7 is used to prepare liquid dye compositions from the following components:

| One atom cobalt complexed with two molecules dye prepared by coupling diazotized— | Shade on nylon rug when dyed by the process of Example 1 |
|---|---|
| 2-aminophenol-4-sulfonamide to benzoylacetonitrile | Burnt orange. |
| 2-aminophenol-4-sulfonamide to aceto acetalanilide | Green-yellow. |
| 2-aminophenol-5-sulfonamide to acetoacetanilide | Yellow. |
| 2-aminophenol-4-sulfonamide to 1-phenyl-3-methyl-5-pyrazolone | Red-yellow. |

EXAMPLE 9

The product and ingredients of Example 2 are used in different proportions to prepare the following liquid-dye composition. To 35 grams Carbitol is added 20 grams of the dye of Example 2, three grams triethanolamine, 22 grams water, and 20 grams of the nonionic surfactant. The mixture is stirred and a clear solution is obtained which has excellent stability. When dyed on undyed nylon rug by the procedure of Example 2, an excellent level shade is obtained which has fastness properties similar to those obtained by the dyeing procedure of Example 2.

EXAMPLE 10

To illustrate use of the invention in a continuous-dyeing procedure, a pad bath is prepared using (a) 2 oz./gal. of dye A in the form of the liquid dye composition of Example 1(a); (b) 2 oz./gal. of a methyl salicylate emulsion, as described in U.S. Patent 2,881,045 patented Apr. 7, 1959; and (c) 2 oz./gal. formic acid. The pad bath is then heated to about 200° F. Samples of several different fibrous materials, including woolen rug; nylon rug, a lining consisting of copolymers of acrylonitrile and vinylpyridine; and a woolen fabric are passed through the hot pad liquor; the excess liquor is removed by passing the wet material through a pair of squeeze rolls and the color then is developed by boiling the padded materials for one minute in a 5% solution of formic acid. Formic acid is then removed by rinsing, then soaping at 140° F. in a 0.1% soap solution and again rinsing. The dyed products, after drying, have a strong, level, green-gold shade. Excellent fastness is also found in the several tests described in Example 1(c).

EXAMPLE 11

If in place of each of the diazo components listed in Example 8, a corresponding component having a methylsulfone group instead of a sulfonamide group is used, a similar shade on nylon rugs is obtained.

I claim:
1. A liquid dyeing composition for coloring nitrogenous and polyamide materials, said composition comprising:
    (a) a metalized dye free of ionogenic groups,
    (b) a polyakylene glycol monoalkyl ether,
    (c) a nonionic surfactant, and
    (d) water,
said metalized dye containing one atom of a metal having an atomic number greater than 23 but less than 29, chelated with two molecules of a monoazo dye.

2. A composition according to claim 1 in which in the polyakylene glycol monoalkyl ether, the monoalkyl-moiety is an alkyl group having less than five carbon atoms.

3. A composition according to claim 2 in which the monoalkyl ether of the polyalkylene glycol is the ethyl ether of diethylene glycol.

4. A composition according to claim 1 in which the nonionic surfactant is an alcohol selected from the group consisting of (a) alkylaryl polyether alcohols and (b) polyoxyethylene ether alcohols.

5. A composition according to claim 4 in which the nonionic surfactant is a condensate of ethylene oxide with nonyl phenol, having an average of six to twelve mols ethylene oxide per mol of phenol.

6. A composition according to claim 1 in which a lower alkanolamine is present.

7. In the process of coloring continuous filament polyamides strong, level shades free of skittery and heathery effects the steps comprising:
    (1) prewetting the polyamide material in an aqueous bath comprising on the weight of the material to be colored (a) 0.1 to 4.0 weight percent of a neutral-dyeing premetalized dye derived by chelating one atom of a metal having an atomic number greater than 23 but less than 29 with two molecules of a monoazo dye free of ionogenic groups,
(b) 0.2 to 5.0 weight percent of a polyakylene glycol monoalkyl ether, and
(c) 0.1 to 2.0 weight percent of a nonionic surfactant,
(2) adding to the aqueous bath from about 20 to 35 weight percent of an alkali-metal salt;
(3) adjusting the pH of the aqueous bath from about 6.0 to 8.5 at ambient temperature;
(4) heating the aqueous bath containing the polyamide material to about 195° to 215° F. to transfer the neutral-dyeing premetalized dye to the polyamide material;
(5) separating the colored material from the aqueous bath, and
(6) thereafter rinsing and drying the colored material.

8. The process of claim 7 in which the pH of the dye bath is adjusted by the addition of an alkanolamine.

9. The polyamide product dyed by the process of claim 7.

10. The polyamide product dyed by the process of claim 8.

References Cited by the Examiner
UNITED STATES PATENTS 2,983,651  5/1961  Seemuller _____ 8—93 X
3,112,983  12/1963  Collins _____ 8—54

NORMAN G. TORCHIN, *Primary Examiner.*

J. HERBERT, *Assistant Examiner.*